US008862826B2

(12) United States Patent
Santifort

(10) Patent No.: US 8,862,826 B2
(45) Date of Patent: Oct. 14, 2014

(54) METHOD AND APPARATUS FOR INCREASING CAPACITY OF CACHE DIRECTORY IN MULTI-PROCESSOR SYSTEMS

(76) Inventor: Conor Santifort, London (GB)

( * ) Notice: Subject to any disclaimer, the term of this patent is extended or adjusted under 35 U.S.C. 154(b) by 213 days.

(21) Appl. No.: 13/591,450

(22) Filed: Aug. 22, 2012

(65) Prior Publication Data

US 2013/0054900 A1 Feb. 28, 2013

(30) Foreign Application Priority Data

Aug. 24, 2011 (GB) .................................. 1114620.6

(51) Int. Cl.
*G06F 12/00* (2006.01)
*G06F 12/08* (2006.01)

(52) U.S. Cl.
CPC ........ *G06F 12/0822* (2013.01); *G06F 12/0897* (2013.01); *G06F 12/0846* (2013.01); *G06F 12/084* (2013.01)

USPC .......................................................... 711/120

(58) Field of Classification Search
None
See application file for complete search history.

(56) References Cited

U.S. PATENT DOCUMENTS

| 4,471,429 A * | 9/1984 | Porter et al. ................... 711/144 |
| 2002/0116533 A1* | 8/2002 | Holliman et al. ............. 709/246 |
| 2003/0005237 A1* | 1/2003 | Dhong et al. .................. 711/146 |
| 2006/0230237 A1 | 10/2006 | Sakamoto |

* cited by examiner

*Primary Examiner* — Matthew Bradley
*Assistant Examiner* — Craig Goldschmidt
(74) *Attorney, Agent, or Firm* — Adam Warwick Bell; Matthew Rupert Kaser

(57) ABSTRACT

A method and an apparatus for increasing capacity of cache directory in multi-processor systems, the apparatus comprising a plurality of processor nodes and a plurality of cache memory nodes and a plurality of main memory nodes.

14 Claims, 8 Drawing Sheets

METHOD AND APPARATUS FOR INCREASING CAPACITY OF CACHE DIRECTORY IN MULTI-PROCESSOR SYSTEMS

RELATIONSHIP TO OTHER APPLICATIONS

This application claims priority to and the benefit of the following UK application: GB1114620.6, filed 24 Aug. 2011, titled "Method and apparatus for increasing capacity of cache directory in multi-processor systems". The applicant claims the benefit of the prior application(s) under any and all relevant section(s) of 35 U.S.C. 119(a) through (d) and (f), 172, and 365(a) and (b) and claims priority under rule 37 CFR 1.55. All prior related applications are hereby incorporated by references for all purposes as allowed by law.

FIELD OF THE INVENTION

This invention relates generally to multi-processor systems and more specifically to the field of cache coherency in multi-processor systems.

BACKGROUND

In order to enhance the processing throughput of computer processor systems, processors typically employ a series of cache memory nodes to provide low latency access to blocks of memory stored therein, as compared to the latency to access main memory. The cache memory nodes hold copies of frequently accessed memory blocks from main memory.

In a system with multiple processors and multiple cache memory nodes it is possible that there exist within the system multiple copies of the same memory block. Two examples of such systems are shown in FIGS. 1A and 1B. Systems such as these require a mechanism for keeping the multiple copies of each memory block synchronised, such that when the value stored in a particular copy of a particular memory block in a particular cache memory node is changed, that change is reflected in all other cache memory nodes and main memory nodes in the system that hold a copy of said particular memory block.

Often a coherency protocol, such as Modified, Owned, Shared, Invalid (MOSI), is used to manage such synchronisation, maintaining consistency between cache memory nodes and main memory nodes. One method the coherency protocol may use to accomplish this is to delay the realisation of a change to a value in a cache memory node until it has deleted all other copies of the memory block containing the value from other cache memory nodes in the system, stalling the processor node connected to that cache memory node.

In order for the coherency protocol to function, it needs a way of discovering which memory blocks are stored in each cache memory node in the system. Often a directory node is used to provide the coherency protocol with a list of the memory blocks held in each cache memory node.

As the number of processor nodes in a multi-processor system increases, the directory node becomes a bottleneck, as every memory access performed by any cache memory node in the system needs to reference the directory node, limiting the performance of the system. This in turn limits the maximum number of processors that can operate efficiently in the system. Thus a need exists to increase the capacity of the directory node.

US2003/0005237 provides a processor-cache operational scheme and topology within a multi-processor data processing system having a shared lower level cache (or memory) by which the number of coherency busses is reduced and more efficient snoop resolution and coherency operations with the processor caches are provided. As illustrated in FIG. 2, L2 cache 209 includes a copy 207A', 207B', 207C' and 207D' of each L1 directory 207A, 207B, 207C and 207D. Precise images of L1 directories 207A, 207B, 207C and 207D are maintained whenever the L1 cache 205A, 205B, 205C and 205D are modified, either by the local processor operations or other external operations. The illustrated cache configuration and coherency operational characteristic eliminates the need to issue coherency operations (e.g. snoops) directly to the L1 directories within the processor modules.

Although US2003/0005237 does provide a performance improvement over a system that needs to issue snoops, it does contain a significant weakness. The L2 cache, 209, only contains a single copy of each L1 directory, therefore can only service a request from one processor node at a time. For example, if all four processor nodes 201A, 201B, 201C and 201D were to issue coherent memory requests A0, A1, A2 and A3 at the same time, the requests would need to be queued and serviced one at a time. For this reason the L2 cache may become a performance bottleneck.

BRIEF SUMMARY OF THE INVENTION

In one embodiment, an apparatus comprising a plurality of processor nodes and a plurality of cache memory nodes and a plurality of main memory nodes. The contents of the cache memory nodes are kept synchronised to each other and to the main memory nodes by a coherency manager. The coherency manager accesses a set of directory nodes as a necessary part of the process of maintaining synchronisation and each directory contains a list of the contents of all of the cache memory nodes, such that there is duplication of all of the contents of each directory node in the other directory nodes. Each directory node can be accessed independently and concurrently by the coherency manager.

DETAILED DESCRIPTION OF THE INVENTION

Figure 1A:
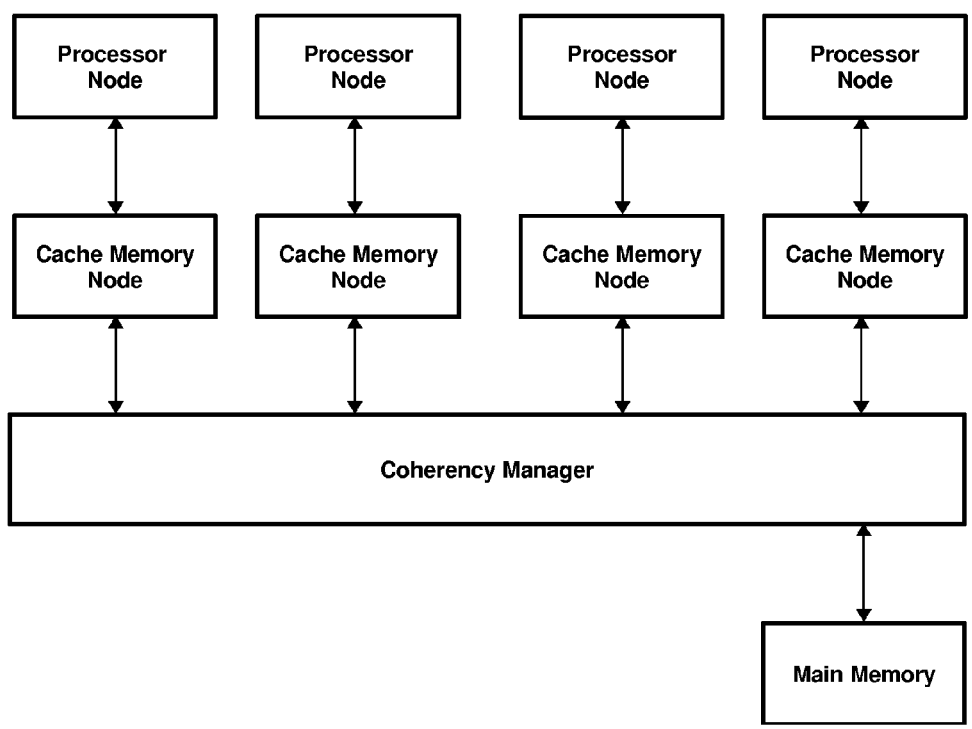
FIG. 1A is a block diagram showing an example of a system with four processor nodes, four cache memory nodes, a single coherency manager and a single main memory node, as known in prior art.
Figure 1B:
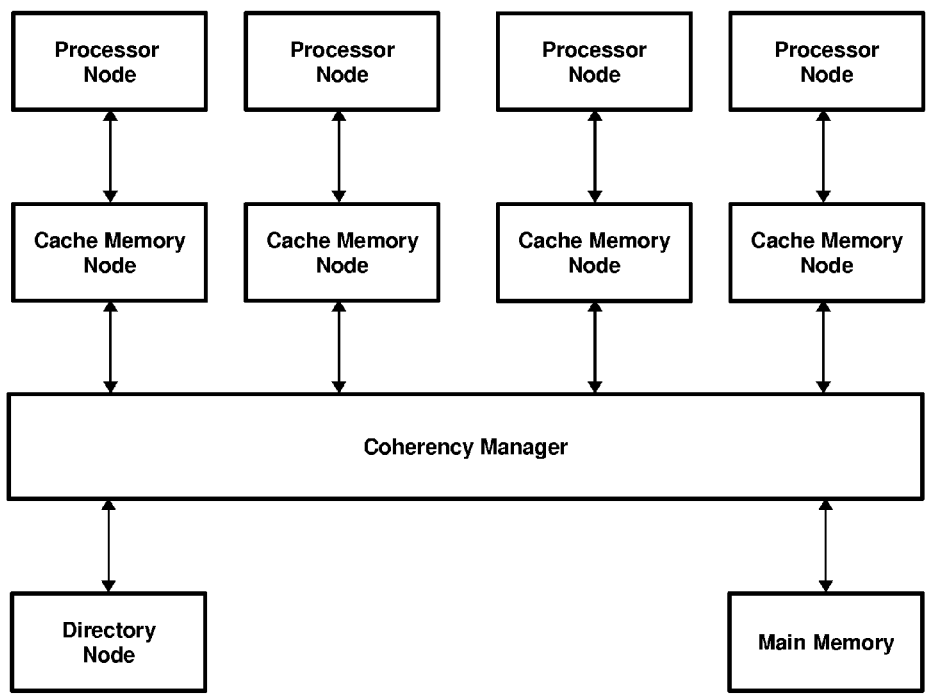
FIG. 1B is a block diagram showing an example of a system with four processor nodes, four cache memory nodes, a single coherency manager, a single directory node and a single main memory node, as known in prior art.
Figure 2:
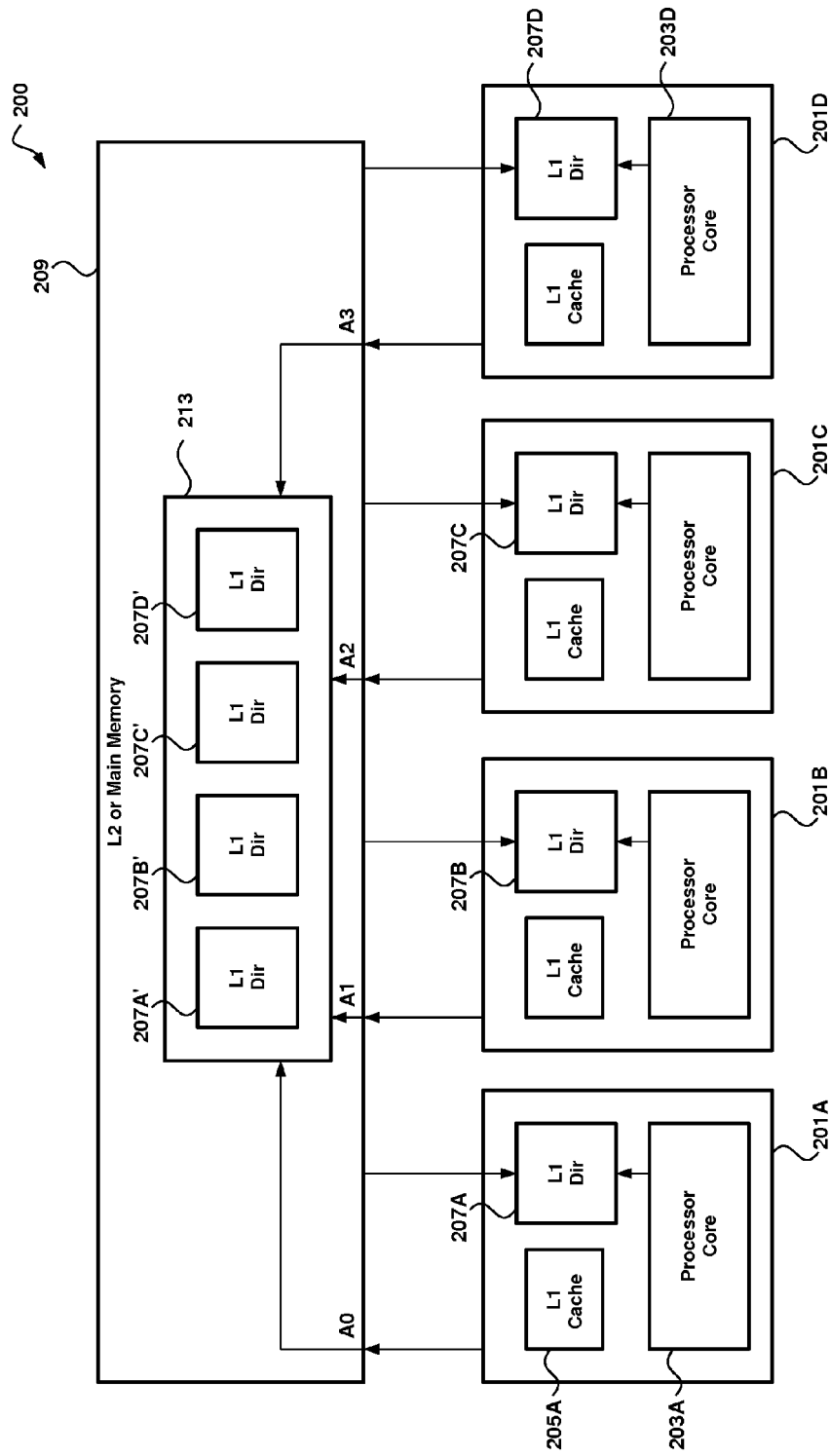
FIG. 2 is a block diagram of a data processing system with modified lower level cache and coherency structure, as known prior art.

All prior patent applications, patents, documents and other publications referred to in this application are hereby incorporated by references for all purposes as allowed by law.

Preferred embodiments of the present invention aim to enable multi-processor systems that may be generally improved in the following respects.

According to one aspect of the present invention, there is provided an apparatus comprising a plurality of processor nodes and a plurality of cache memory nodes and a plurality of directory nodes and one or more main memory nodes, wherein each directory node contains a copy of the information contained in the other directory nodes and wherein each directory node can be accessed independently and concurrently by the cache memory nodes, and wherein each directory node is used to service memory access requests from a subset of the processor nodes in the system. The duplication of the directory node contents between the plurality of directory nodes enables each cache memory node to synchronise its contents with the contents of all other cache memory nodes in the system while removing the bottleneck of only having a single directory node which all cache memory nodes must access sequentially. Thus the performance of cache memory synchronisation is improved.

Furthermore, according to the present invention there is provided an apparatus comprising a plurality of processor nodes and a plurality of cache memory nodes and one or more main memory nodes, and where the contents of the cache memory nodes are kept synchronised to each other and to the main memory nodes by accessing two or more directory nodes and where each directory node contains a list of the contents of more than one of the cache memory nodes, such that there is duplication of some or all of the contents of each directory node in the other directory nodes, and where each directory node can be accessed independently and concurrently in order to improve the performance of said synchronisation.

The advantage of providing two or more directory nodes is that each can provide a dedicated directory service to a subset of the cache memory nodes in the system. Moreover, the form and structure of the information stored in each directory node is not important. It is only required that each directory node contain sufficient information so that a cache memory node can make decisions based on where copies of memory blocks are currently located within the system.

The apparatus may include a coherency manager, where the cache memory nodes send their access requests to said coherency manager and said coherency manager accesses multiple directory nodes simultaneously in order to service multiple access requests simultaneously. The coherency manager may reorder and prioritise said access requests in order to improve the performance of the apparatus.

Said coherency manager may be realised as a plurality of coherency managers wherein each coherency manager is responsible for managing the synchronisation of a subset of said cache memory nodes. This may allow the apparatus to achieve higher performance through a higher level of parallelism.

The plurality of coherency managers may exchange messages directly between each other in order to resolve conflicts more quickly, thus improving the performance of cache memory synchronisation.

The cache memory nodes may be configured to maintain the contents of the directory nodes, updating the contents of the directory nodes using the same control functions that are used to update the contents of the cache memory nodes, thus simplifying the design of the apparatus.

The processor nodes may be configured to maintain the contents of the directory nodes, thus allowing the functions of the apparatus to be easier to modify through software changes and allowing for a simpler form of cache memory node.

The coherency manager or plurality of coherency managers may be configured to maintain the contents of the directory nodes, allowing the coherency managers to better synchronise the operations of reading and updating the contents of the directory nodes in order to improve the performance of cache memory synchronisation.

An exemplary embodiment of the invention will now be described, by way of example, with reference to the accompanying drawings, described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figure 3:
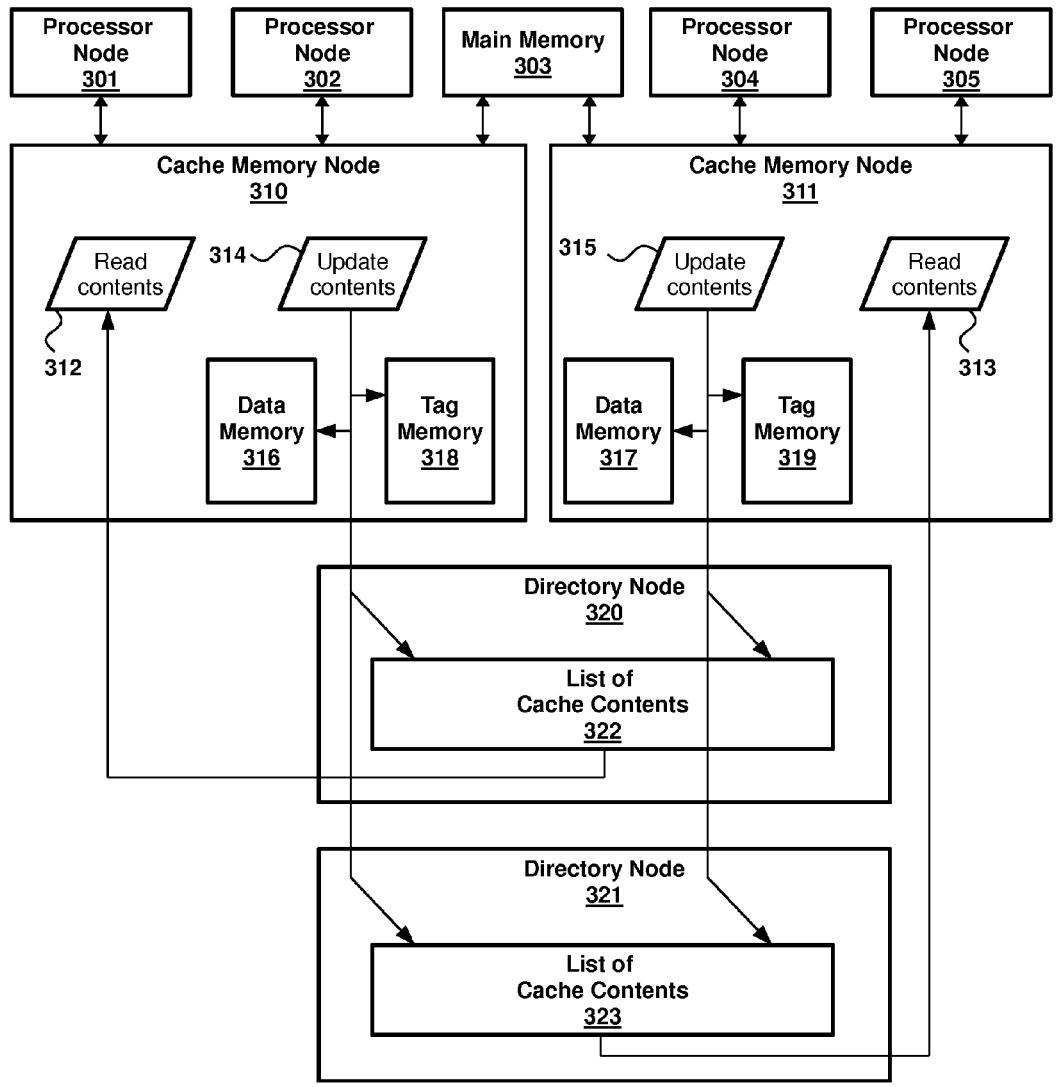
FIG. 3 is a block diagram of one embodiment of a system, in accordance with some aspects of the present invention, with four processor nodes, two cache memory nodes, two directory nodes and a single main memory node.

Turning to FIG. 3, a block diagram of one embodiment of a system is shown. In the illustrated embodiment, the system includes a plurality of processor nodes 301, 302, 304 and 305. The system includes two cache memory nodes 310 and 311. Two of the processor nodes 301 and 302 connect to cache memory node 310. Two of the processor nodes 304 and 305 connect to cache memory node 311. The system includes two directory nodes 320 and 321. Cache memory node 310 is connected to directory nodes 320 and 321 for purposes of updating the contents of said directory nodes. Cache memory node 310 is connected to directory node 320 for purposes of reading the contents of said directory node as part of the process of synchronising said cache memory node to cache memory node 311. Cache memory node 311 is connected to directory nodes 320 and 321 for purposes of updating the contents of said directory nodes. Cache memory node 311 is connected to directory node 321 for purposes of reading the contents of said directory node as part of the process of synchronising said cache memory node to cache memory node 310.

Each cache memory node 310 and 311 consists of a data memory and a tag memory coupled to a respective cache control circuit.

Generally cache memory node 310 may be configured to cache blocks of memory from main memory for access by the corresponding processor node 301 and 302. Generally cache memory node 311 may be configured to cache blocks of memory from main memory for access by the corresponding processor node 304 and 305. The memory blocks may hold either instructions or data. The cache memory nodes each comprise a plurality of entries, where each entry is capable of storing a memory block. Additionally each entry may store a state of the block, as well as any other relevant information for the memory block such as the address tag or information for a replacement algorithm (such as least recently used state).

In the illustrated embodiment the directory nodes 320 and 321 each contain a list of cache contents 322 and 323. The list of cache contents contains a complete list of the contents of all the cache memory nodes in the system, and is updated when the contents of any cache memory node changes. In this way a single directory node provides a complete map of the contents of all the cache memory nodes in the system.

In the illustrated embodiment, the list of contents within the directory nodes is updated at the same time as the contents of the cache memory nodes are updated. In other embodiments there may be a delay between the cache memory nodes contents changing and the directory node contents changing.

In the illustrated embodiment, the cache memory nodes 310 and 311 are each able to handle a memory access request from a processor node simultaneously. Cache memory node 310 passes the memory request to directory node 320. Cache memory node 311 passes the memory request to directory node 321.

Figure 4:
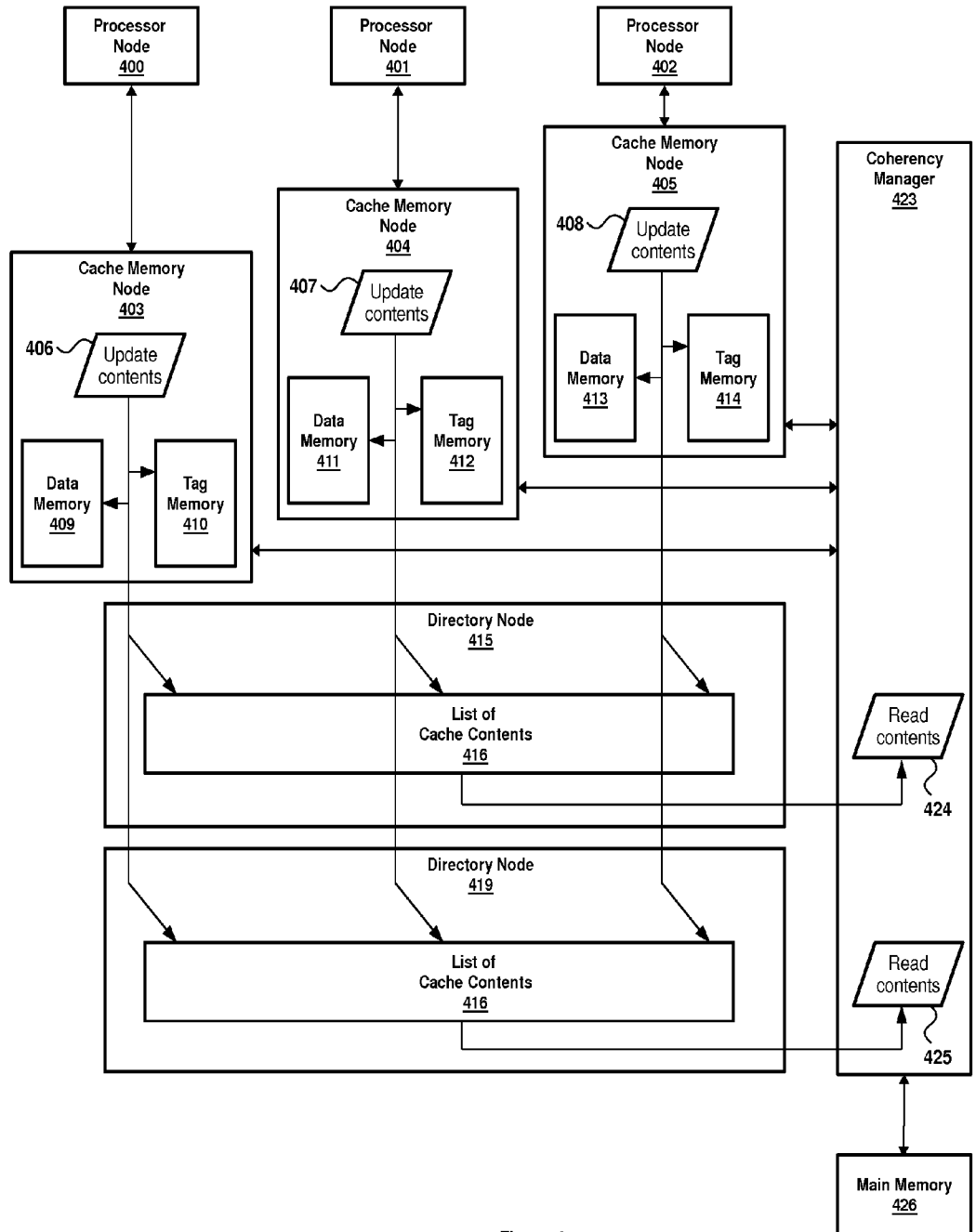
FIG. 4 is a block diagram of one embodiment of a system, in accordance with some aspects of the present invention, with three processor nodes, three cache memory nodes, a single coherency manager, two directory nodes and a single main memory node.

Turning now to FIG. 4, a block diagram of one embodiment of a system is shown. In the illustrated embodiment, the system includes a plurality of cache memory nodes (e.g. cache memory nodes 403, 404 and 405). Each cache memory node is connected to one processor node 400, 401 and 402. In other embodiments (see above with reference to FIG. 3) the cache memory nodes may each connect to multiple processor nodes. In other embodiments (not illustrated) the cache memory nodes may each connect to a further cache memory node which is connected to a processor node.

In the illustrated embodiment each cache memory node is also connected to the coherency manager 423. The coherency manager is connected to at least one main memory node 426. In the illustrated embodiment, the coherency manager is connected to two directory nodes 415 and 419. In other embodiments the cache memory nodes may connect directly to the main memory node. Each cache memory node 403, 404 and 405 consists of a data memory and a tag memory coupled to a respective cache control circuit. Each directory node 415 and 419 contain a list of cache contents 416 and 420.

Generally the cache memory nodes 403, 404 and 405 may be configured to cache blocks of memory from main memory for access by the corresponding processor node 400, 401 and 402. The memory blocks may hold either instructions or data. The cache memory nodes each comprise a plurality of entries, where each entry is capable of storing a memory block. Additionally each entry may store a state of the block, as well as any other relevant information for the memory block such as the address tag or information for a replacement algorithm (such as least recently used state).

In the illustrated embodiment the list of cache contents 416 and 420 contains a complete list of the contents of all the cache memory nodes in the system, and is updated when the contents of any cache memory node changes. In this way a single directory node provides a complete map of the contents of all the cache memory nodes in the system.

In the illustrated embodiment, the list of cache contents within the directory nodes is updated at the same time as the contents of the cache memory nodes are updated. In other embodiments there may be a delay between the cache memory nodes contents changing and the directory contents changing.

In the illustrated embodiment, the coherency manager is logically divided into two channels. In other embodiments the coherency manager may be logically divided into three or more channels.

In the illustrated embodiment, the coherency manager is able to handle two memory access requests simultaneously by passing one of the requests to directory node 415 and the other request to directory node 419.

Figure 5:
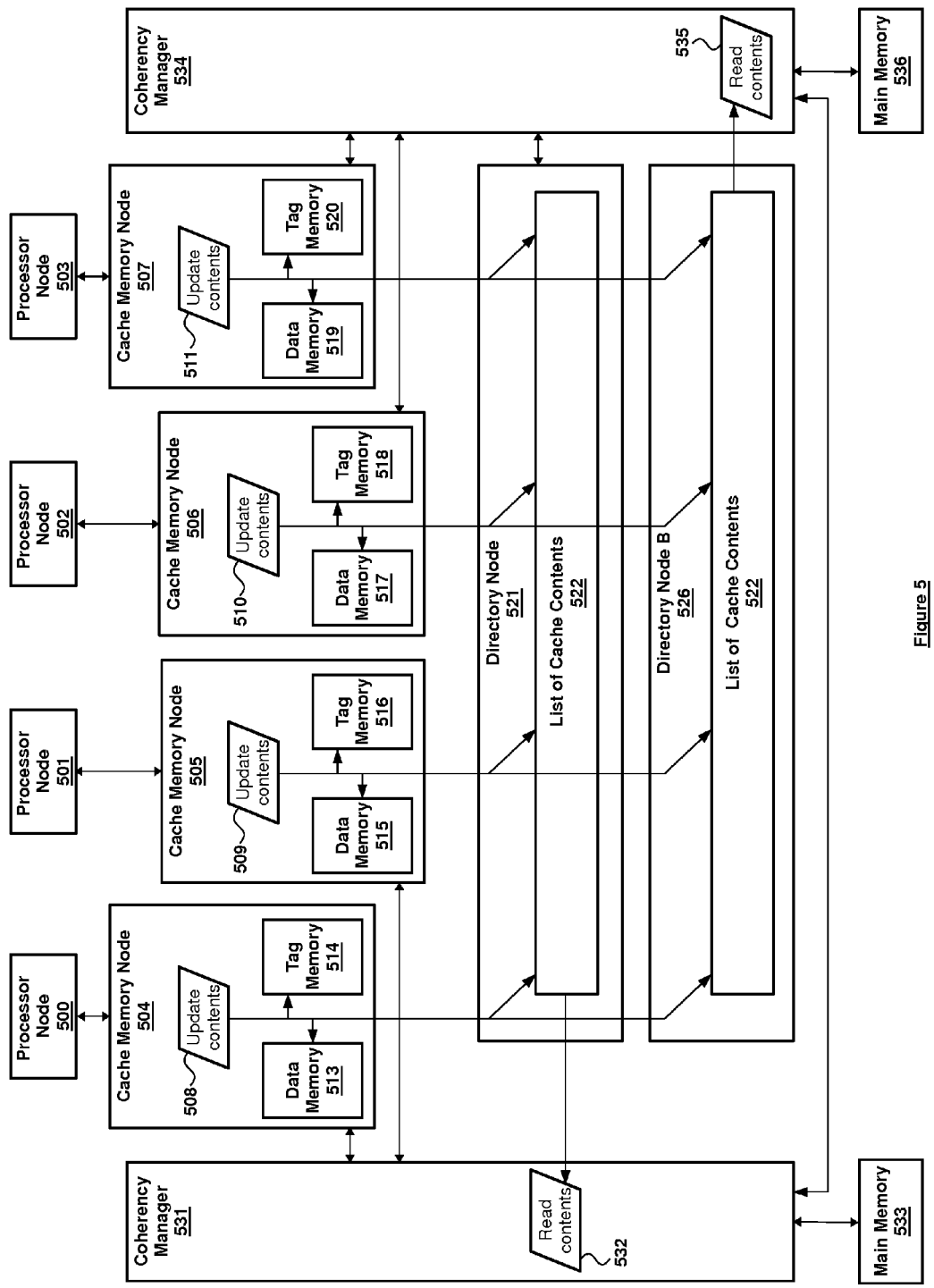
FIG. 5 is a block diagram of one embodiment of a system, in accordance with some aspects of the present invention, with four processor nodes, four cache memory nodes, two coherency managers, two directory nodes and two main memory nodes.

Turning now to FIG. 5, a block diagram of one embodiment of a system is shown. In the illustrated embodiment, the system includes a plurality of cache memory nodes (e.g. cache memory nodes 504, 505, 506 and 507 in FIG. 5). Each cache memory node is connected to one processor node 500, 501, 502 and 503. Each cache memory node is also connected to one of two coherency managers 531 and 534. The coherency managers each connect to one main memory node 533 and 536. Coherency manager 504 is connected to directory node 521. Coherency manager 534 is connected to directory node 526. Each cache memory node 504, 505, 506 and 507 consists of a data memory and a tag memory coupled to a respective cache control circuit. Each directory node 521 and 526 contain a list of cache contents 522 and 527.

Generally the cache memory nodes 504, 505, 506 and 507 may be configured to cache blocks of memory from main memory for access by the corresponding processor node 500, 501, 502 and 503. The memory block may hold either instructions or data. The cache memory nodes each comprise a plurality of entries, where each entry is capable of storing a memory block. Additionally each entry may store a state of the block, as well as any other relevant information for the memory block such as the address tag or information for a replacement algorithm (such as least recently used state).

In the illustrated embodiment, the coherency memory system is logically divided into two channels. Channel A consists of coherency manager 531, directory node 521, cache memory node 504 and cache memory node 505. Channel B consists of coherency manager 534, directory node 526, cache memory node 506 and cache memory node 507. In other embodiments there may be more than two channels.

In the illustrated embodiment, when one of the cache memory nodes belonging to channel A issues a memory access request to coherency manager 531, the coherency manager passes the request to directory node 521. When one of the cache memory nodes belonging to channel B issues a memory access request to coherency manager 534, the coherency manager passes the request to directory node 526. In this way the system can handle two requests at once. Directory node 521 has a complete list of the contents of all the cache memory nodes in the system. Likewise directory node 526 has a complete list of the contents of all the cache memory nodes in the system. In one embodiment the directory nodes communicates directly with the cache controller in each cache memory node in the system.

Figure 6:
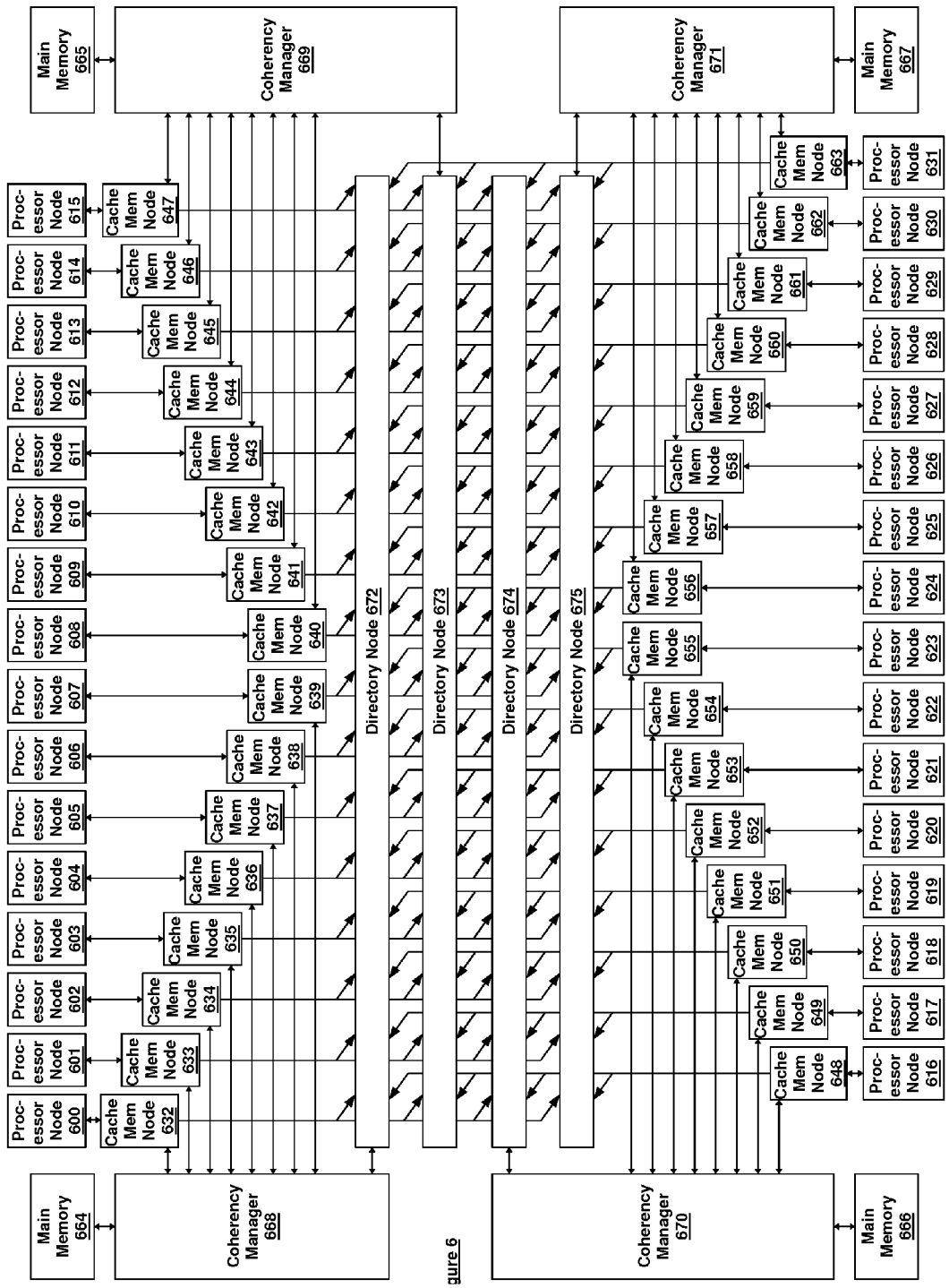
FIG. 6 is a block diagram of the preferred embodiment of a system, in accordance with some aspects of the present invention, with 32 processor nodes, 32 cache memory nodes, four coherency managers, four directory nodes and four main memory nodes.

Turning now to FIG. 6, a block diagram of the preferred embodiment of a system is shown. In the illustrated embodiment, the system includes 32 cache memory nodes (e.g. cache memory nodes 632 to 663 in FIG. 6). Each cache memory node is connected to one processor node 600 to 631. Each cache memory node is also connected to one of four coherency managers 668 to 671. The coherency managers each connect to one main memory node 664 to 667. Coherency manager 668 is connected to directory node 672. Coherency manager 669 is connected to directory node 673. Coherency manager 670 is connected to directory node 674. Coherency manager 671 is connected to directory node 675.

In the illustrated embodiment, the coherency memory system is logically divided into four channels. Channel A consists of coherency manager 668, directory node 672, and cache memory nodes 632 to 639. Channel B consists of coherency manager 669, directory node 673, and cache memory nodes 641 to 647. Channel C consists of coherency manager 670, directory node 674, and cache memory nodes 648 to 655. Channel D consists of coherency manager 671, directory node 675, and cache memory nodes 656 to 663. In other embodiments there may be more than four channels.

In the illustrated embodiment, when one of the cache memory nodes belonging to channel A issues a memory access request to coherency manager 668, the coherency manager passes the request to directory node 672. When one of the cache memory nodes belonging to channel B issues a memory access request to coherency manager 669, the coherency manager passes the request to directory node 673. When one of the cache memory nodes belonging to channel C issues a memory access request to coherency manager 670, the coherency manager passes the request to directory node 674. When one of the cache memory nodes belonging to channel D issues a memory access request to coherency manager 671, the coherency manager passes the request to directory node 675. In this way the system can handle four requests at once. Directory node 672, has a complete list of the contents of all the cache memory nodes in the system. Likewise directory node 673, directory node 674 and directory node 675, each have a complete list of the contents of all the cache memory nodes in the system. In one embodiment the directory nodes communicate directly with the cache controller in each cache memory node in the system.

Figure 7:
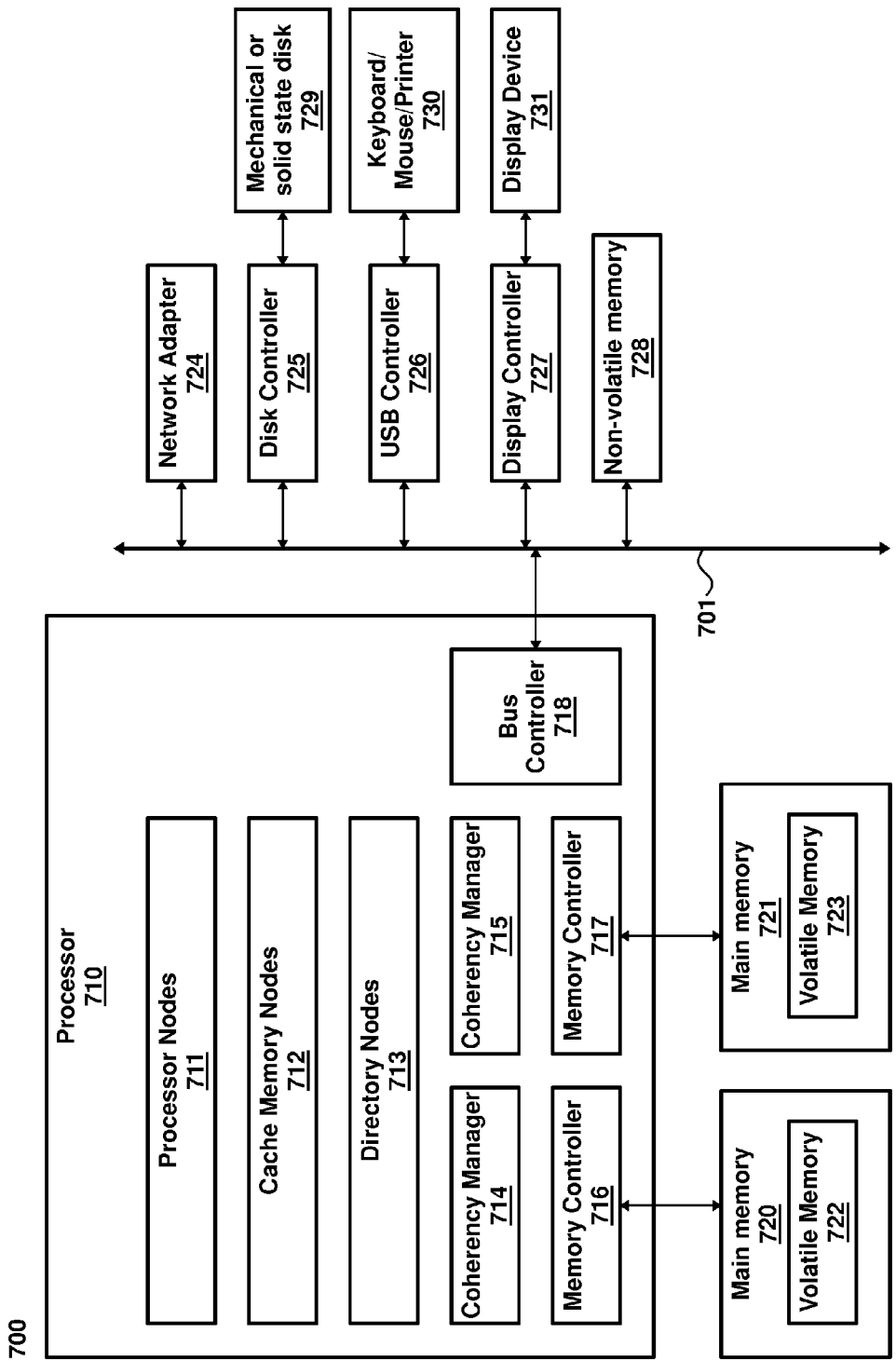
FIG. 7 is a high-level block diagram of the functional infrastructure of a computer system that may be used to implement one possible embodiment of the present invention.

Turning now to FIG. 7, a high-level block diagram of the functional infrastructure of a computer system 700 that may be used to implement one possible embodiment of the invention. The system 700 includes, but is not limited to, a desktop computer, a laptop computer, a netbook, a tablet computer, a notebook computer, a smartphone, a server, a workstation, a supercomputer, or any other type of computing device. In another embodiment, the system 700 may be a system on chip integrated circuit.

The processor 710 has a number of processor nodes 711 to execute instructions of the system 700. The processor also has a number of cache memory nodes 712 to cache instructions and/or data of the system 700. In another embodiment the cache memory nodes include, but are not limited to, level one, level two and level three, cache memory or any other configuration of cache memory within the processor 710.

The processor may have a number of directory nodes 713 and may have a number of coherency managers 714 and 715. In another embodiment the function of the directory nodes and the coherency managers may be performed within the cache memory nodes.

The processor has a number of memory controllers 716 and 717 where each memory controller is used to control and access a main memory node 720 and 721. The main memory may include volatile memory 722, such as synchronous dynamic random access memory (SDRAM), dynamic random access memory (DRAM) and/or other types of volatile memory.

The coherency manager nodes 714 and 715 are used to synchronise the contents of the cache memory nodes 712, the directory nodes 713 and the main memories 720 and 721.

The bus controller 718 performs functions that enable the processor 710 to access and communicate with a number of input output devices and with non-volatile memory 728. In one embodiment the bus controller may be a PCI Express controller. Common examples of input/output devices include keyboards, mice and printers 730, display devices 731 such as monitors or liquid crystal display (LCD) panels. The computer system can be connected to other systems or network attached storage (NAS) through network adaptors 724. The non-volatile memory 728 includes, but is not limited to, NAND flash memory, NOR flash memory, read only memory (ROM), electrically erasable programmable read only memory (EEPROM), or any other type of non-volatile memory device.

The main memory 720 and 721 stores information and instructions to be executed by the processor 710. The main memory may also store temporary variables or other intermediate information while the processor 710 is executing instructions.

While the modules shown in FIG. 6 are depicted as separate blocks within the system 700, the functions performed by some of these blocks may be integrated within a single semiconductor integrated circuit or may be implemented using two or more separate integrated circuits. For example, although the cache memory nodes 712 are depicted as a block incorporated within the processor, the cache memory nodes can be implemented as a separate blocks within the system, separate from the processor. In another embodiment, the system may include more than one processor block.

The invention claimed is:

1. An apparatus comprising a plurality of processor nodes (301, 302, 304 and 305) and a plurality of cache memory nodes (310 and 311) and one or more main memory nodes (303), and where the contents of the cache memory nodes are kept synchronised to each other and to the main memory nodes by accessing two or more directory nodes (320 and 321) and where each directory node contains a list of the contents of more than one of the cache memory nodes, such that there is duplication of some or all of the contents of each directory node in the other directory nodes, and where each directory node can be accessed independently and concurrently in order to improve the performance of said synchronisation.

2. The apparatus of claim 1, wherein the contents of the cache memory nodes are kept synchronised to each other and to the main memory node (426) by a coherency manager (423), where the coherency manager assesses a set of directory nodes (415 and 419) as a necessary part of the process of maintaining synchronisation.

3. The apparatus of claim 2, wherein the coherency manager is realised as a plurality of coherency managers (531 and 534) where each coherency manager is responsible for managing the synchronisation of a subset of the cache memory nodes.

4. The apparatus of claim 3, where the plurality of coherency managers are configured to exchange messages with each other to maintain synchronisation between the full set of cache memory nodes.

5. The apparatus of claim 1, wherein the cache memories are configured to create and maintain the contents of the directory nodes.

6. The apparatus of claim 1, wherein the processor nodes are configured to create and maintain the contents of the directory nodes.

7. The apparatus of claim 3, wherein the coherency managers are configured to create and maintain the contents of the directory nodes.

8. A method of maintaining synchronisation between a plurality of cache memory nodes, providing a plurality of processor nodes (301, 302, 304 and 305) and a plurality of cache memory nodes (310 and 311) and one or more main memory nodes (303), and wherein the contents of the cache memory nodes are kept synchronised with each other and to the main memory nodes by accessing two or more directory nodes (320 and 321), each directory node storing a list of the contents of more than one of the cache memory nodes, such that there is duplication of some or all of the contents of each directory node in the other directory nodes, whereby each directory node can be accessed independently and concurrently.

9. The method of claim 8, providing a coherency manager (423) where said coherency manager maintains the synchronisation of the contents of the cache memory nodes to each other and to the main memory node (426), by accessing a set of directory nodes (415 and 419) as a necessary part of the process of maintaining synchronisation.

10. The method of claim 9, providing a plurality of coherency managers (531 and 534) where each coherency manager is responsible for managing the synchronisation of a subset of the cache memory nodes.

11. The method of claim 10, where the plurality of coherency managers exchange messages with each other to maintain synchronisation between the full set of cache memory nodes.

12. The method of claim 10, where the contents of the directory nodes are created and maintained by the cache memories.

13. The method of claim 10, where the contents of the directory nodes are created and maintained by the processor nodes.

14. The method of claim 10, where the contents of the directory nodes are created and maintained by the coherency managers.

* * * * *